United States Patent
Randle

(10) Patent No.: US 6,431,766 B1
(45) Date of Patent: Aug. 13, 2002

(54) METHOD OF ALIGNMENT IN AN OPTOELECTRONIC ASSEMBLY

(75) Inventor: Frederick Randle, Shalstone (GB)

(73) Assignee: Bookham Technology PLC, Abingdon (GB)

(*) Notice: Subject to any disclaimer, the term of this patent is extended or adjusted under 35 U.S.C. 154(b) by 16 days.

(21) Appl. No.: 09/707,732

(22) Filed: Nov. 6, 2000

(30) Foreign Application Priority Data

Nov. 16, 1999 (GB) ............................................. 9926927

(51) Int. Cl.[7] .............................. G02B 6/00; G02B 6/255
(52) U.S. Cl. .......................................................... 385/92
(58) Field of Search ............................. 385/88–93, 147, 385/122; 359/107; 438/29

(56) References Cited

U.S. PATENT DOCUMENTS

| | | | |
|---|---|---|---|
| 4,779,946 A | | 10/1988 | Pimpinella et al. |
| 5,297,068 A | * | 3/1994 | Guilfoyle et al. ............ 359/107 |
| 5,432,722 A | * | 7/1995 | Guilfoyle et al. ............ 359/107 |
| 5,917,980 A | * | 6/1999 | Yoshimura et al. .......... 385/122 |
| 6,338,975 B1 | * | 1/2002 | Yoshimura et al. ............ 438/29 |

* cited by examiner

*Primary Examiner*—Akm E. Ullah
(74) *Attorney, Agent, or Firm*—Kirschstein, et al.

(57) ABSTRACT

The invention provides a method of generating an alignment feature (200, 300) in an optoelectronic assembly (10, 700) which enables another part, for example an optical fibre (80), external to the assembly to be aligned to a device (40, 400) within the assembly (10, 700) but without needing to be attached to the device (40, 400). The method involves using the device (40, 400) to define a position for its own alignment feature to which the part can register, thereby aligning the part (80) to the device (40, 400). When the device (40) is an emissive device, radiation emitted therefrom is used to delineate a position for the alignment feature. When the device (400) is a detecting device, the feature is defined with assistance of an apparatus (500) whose beam is guided in response to output from the device (400) to delineate a position for the alignment feature. The position of the alignment feature can be first defined in a system of layers (100) responsive to radiation from the device (40) or from the apparatus (500), and then transferred from the system of layers (100) by etching processes into a wall (70) of the assembly (10, 700) to provide a recess therein into which the part (80) can register for aligning to the device (40, 400).

27 Claims, 5 Drawing Sheets

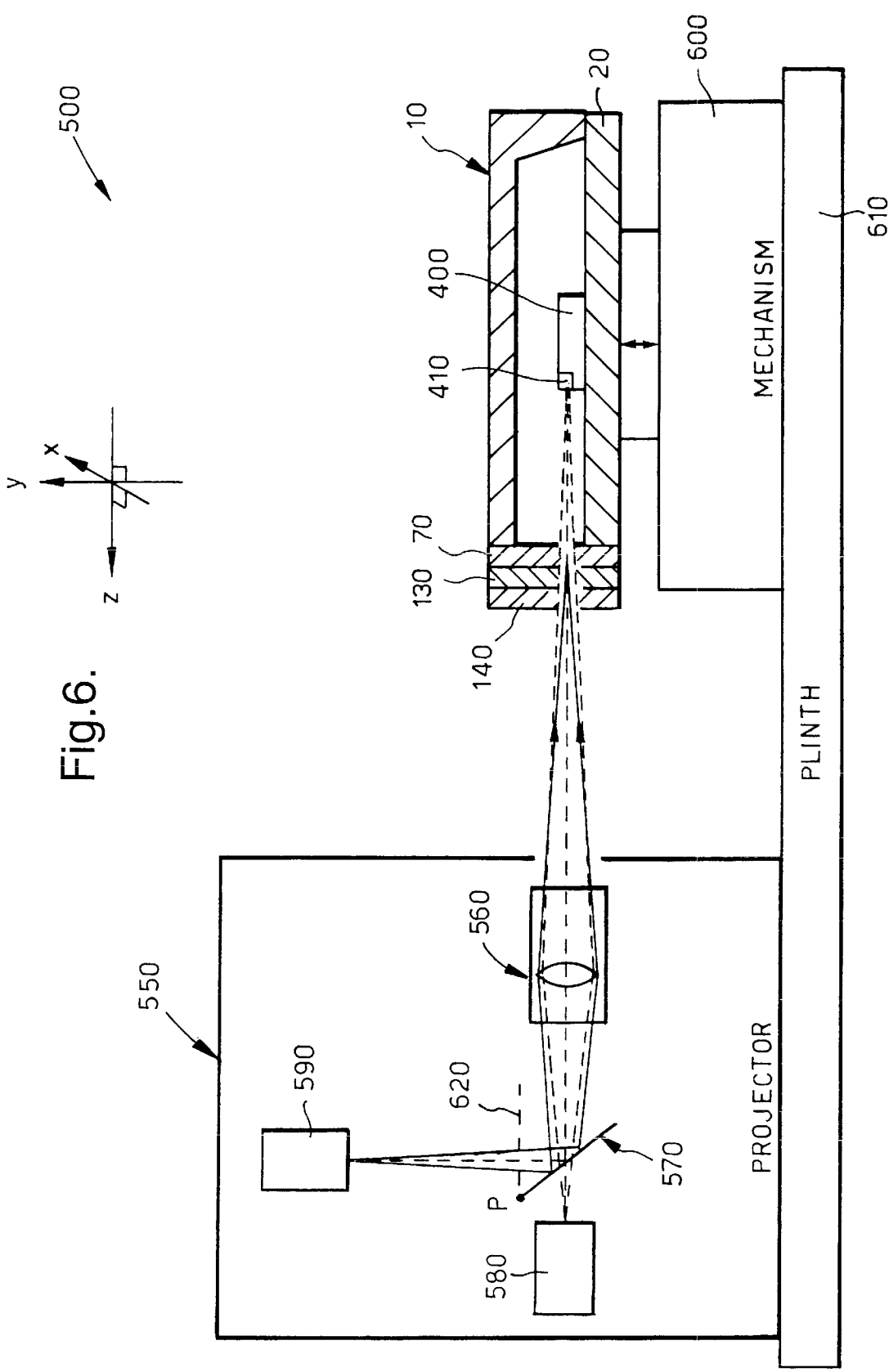

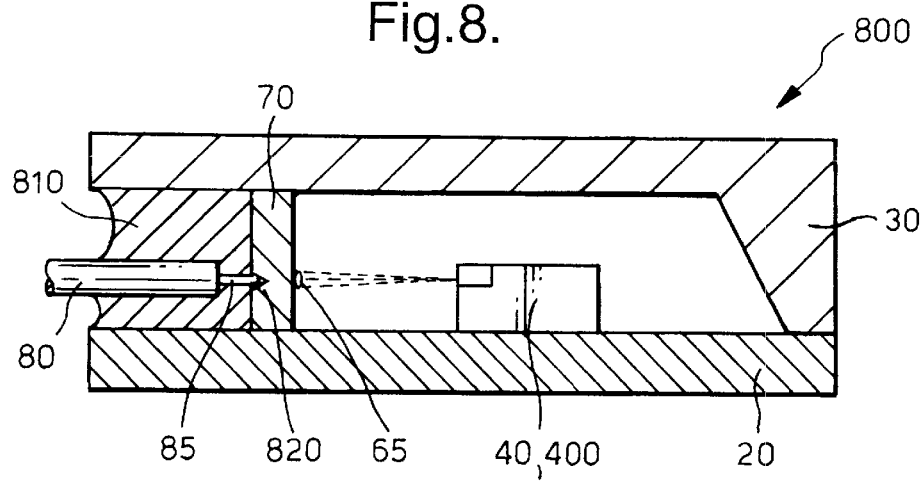
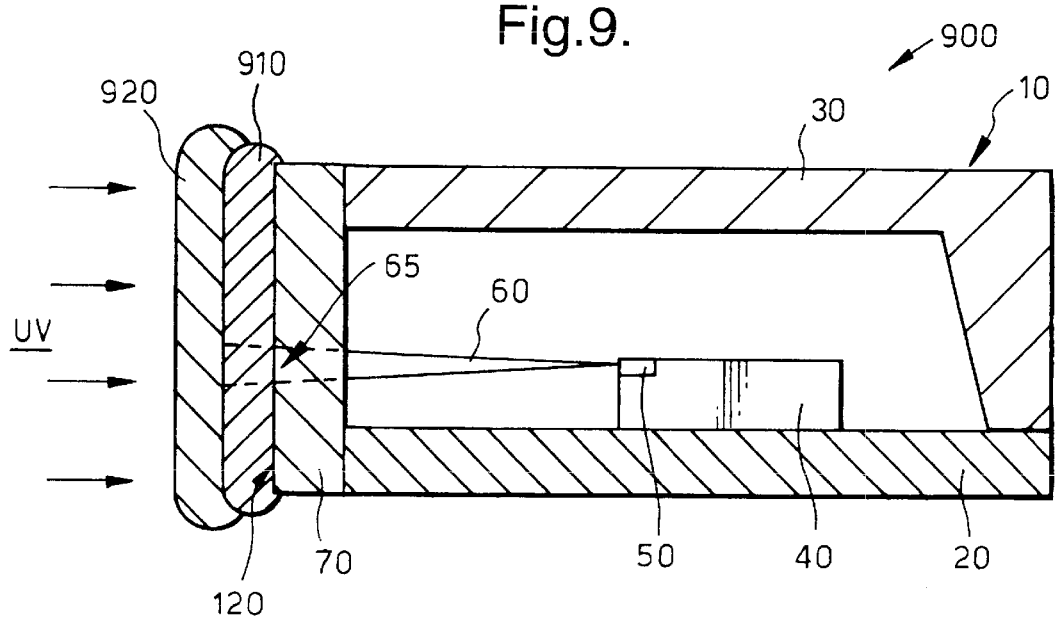

METHOD OF ALIGNMENT IN AN OPTOELECTRONIC ASSEMBLY

BACKGROUND OF THE INVENTION

This invention relates to a method of alignment in an optoelectronic assembly, in particular, but not exclusively, to a method of generating an alignment feature in an optoelectronic assembly which enables another part, for example an optical fibre, to be aligned to a device within the assembly.

Conventionally, a micro fabricated optoelectronic device, for example a single chip photodetector or laser source device, is packaged within an associated hermetically sealed package for protection. An optical fibre for conveying electromagnetic radiation to or from the device is attached to the package and penetrates through the package to contact directly onto the device. Alternatively, the optical fibre penetrates through the package to align remotely to the device, a secondary structure physically connecting to the device and receiving an end of the fibre thereby securing the fibre in alignment with the device. Alignment of the optical fibre to the device can often be difficult to achieve especially when the fibre is a monomode fibre having an associated core diameter in the order of a few ricrometres. When the device is a III–V compound device, for example a gallium-indiumarsenide laser source, alignment of the fibre to the device can be critical; an alignment error in the order of 0.1 μm can adversely affect coupling efficiency of the device to the fibre. There also arises an issue of mechanical stability where the optical fibre abuts onto the device; relative movement therebetween over time of tens of nanometres can adversely effect transmission efficiency from the device into the fibre or detection efficiency of the device to incoming fibre-borne radiation.

There are a number of conventional approaches to assist with aligning optical fibres to associated devices.

In a first conventional approach, there is provided an optoelectronic device housed within a hermetically sealed package, the device having etched thereinto a channel for receiving a core of an optical fibre, the fibre passing from a region exterior to the package through the package to terminate on the device. Assembly of the fibre to the device requires considerable operator skill and damage can occur to the device if the fibre is misdirected during assembly, for example the fibre scraping and severing metal electrodes of the device. Location of the core in the channel can occur by mechanical abutment although optically transparent bonding agents, for example Norland Inc. optically transparent UV curing adhesive, can be advantageously added to obtain a robust joint.

In a second alternative approach, an epitaxial alignment structure is formed onto the device to provide lateral abutment edges onto which the core can register. However, this second approach suffers the same disadvantages of the first approach in that a skilled operator is required for manipulating the core to align it precisely to the device without causing damage thereto.

In a granted U.S. Pat. No. 4,892,377, the inventor discloses an approach to accurately align an array of optical fibres with corresponding optical components such as waveguides. The fibres are fixed in accurately etched V-grooves formed into a substrate connected to the optical components and can be secured thereto using solder. Such an approach requires skilled operators to manipulate the fibres into the V-grooves to obtain a satisfactory alignment providing acceptable matching.

The inventor has appreciated that it is desirable to accurately align fibres to devices without having to physically bond or abut the fibres to the devices. Superficially, such an approach would seem unworkable because each fibre would have to be accurately aligned to an associated intermediate region and a corresponding device would also have to be accurately aligned to the intermediate region thereby fixing the fibre spatially with respect to the device; this would result in a build up of tolerances which would be more difficult to control than the first and second conventional approaches described above.

The inventor has evolved a method of alignment in an optoelectronic assembly which addresses alignment problems associated with spatially defining a fibre's position with respect to an associated device within the assembly without having to bond the fibre directly to the device within the assembly as in the prior art.

SUMMARY OF THE INVENTION

According to a first aspect of the present invention, there is provided a method of alignment in an optoelectronic assembly, the assembly including one or more optoelectronic devices and interfacing means for interfacing from the one or more devices to one or more corresponding optoelectronic components external to the assembly, the method characterised in that it includes the steps of:

(a) defining one or more regions of the interfacing means to which the one or more devices are responsive to or emissive towards, thereby rendering the one or more regions delineated for processing purposes;

(b) processing the assembly to generate one or more alignment features at the one or more regions, the one or more features operable to assist with aligning the one or more external components relative to their respective one or more devices within the assembly;

(c) aligning the one or more components to their respective features so as to be operable to emit towards or receive radiation from their respective one or more devices; and (d) applying attaching means for attaching the one or more external components to the assembly when aligned to their respective features, the one or more components thereby optically aligned to their corresponding one or more devices within the assembly.

The method provides the advantage that the one or more devices are capable of defining positions of their respective alignment features in the interfacing means, thereby assisting to align the one or more external components to the devices without the position of the interfacing means needing to be initially precisely defined with respect to the one or more devices.

Advantageously, in step (a), the interfacing means includes a wall of the assembly, the wall bearing a system of layers responsive to radiation emitted from the one or more devices within the assembly for defining the one or more regions in the system of layers, the layers providing a template for the formation of the alignment features in step (b). Inclusion of the system of layers enables the one or more devices to define positions of their corresponding one or more alignment features, the system of layers responsive to radiation emitted from the one or more devices.

Conveniently, the system of layers comprises:

(a) an etch resist layer through which the wall is processable to generate the one or more features therein; and (b) a photochromic layer operable to be activated by externally applied radiation and capable of being rendered locally transmissive in response to radiation received thereat from the one or more devices, thereby enabling the externally applied radiation to define regions in the resist layer corresponding to the one or more features, the resist layer providing a template for formation of the one or more features. Use of the photochromic layer provides a simplified method of alignment which does not need to be conducted in darkroom conditions.

Alternatively, the system of layers includes multiplying means for frequency multiplying radiation emitted from the one or more devices within the assembly, thereby generating corresponding relatively shorter wavelength radiation for defining the one or more regions in one or more layers of the system. Inclusion of the multiplying means enables one or more of the devices emitting infra-red radiation having a wavelength in the order of 1300 to 1550 nm to form a latent image in the system of layers, the latent image processable for ultimately forming a template in the system of layers through which the wall can be etched to generate the alignment features therein.

The multiplying means preferably comprises a multiplying layer including potassium titanyl phosphate which is operable to emit radiation at a relatively shorter wavelength when stimulated by relatively longer wavelength radiation emitted from the one or more devices. Use of potassium titanyl phosphate material enables infra-red radiation output from the one or more devices within the assembly to be transformed to radiation within the visible electromagnetic radiation spectrum to which other of the layers of the system are responsive.

In order to provide adequate spatial resolution for delineating the alignment features, the multiplying layer beneficially comprises a continuous film of potassium titanyl phosphate.

Advantageously, the system of layers includes a photoresponsive layer responsive to radiation emitted from the one or more devices within the assembly subject to frequency multiplication in the multiplying means, the photoresponsive layer processable to define a first template which is transferable to an etch resist layer of the system, the etch resist layer forming a second template through which the wall is processable to generate the one of more features therein. Use of the photoresponsive layer enables radiation within the visible range to define features in the photoresponsive layer which can be transferred from that layer by ultra violet (UV) radiation exposure to a photoresist layer, the photoresist layer being required to withstand etching gases or solutions where alignment features are not to be formed into the wall.

Conveniently, where direct responsivity to infra-red radiation is required in the system of layers, the system includes a photoresponsive layer directly responsive to radiation emitted from the one or more devices within the assembly, the photoresponsive layer processable to define a first template which is transferable to an etch resist layer of the system, the etch resist layer forming a second template through which the wall is processable to generate the one of more features therein.

The method of the invention according to the first aspect described in the foregoing is modified where the assembly incorporates one or more devices which are not radiation emissive. Preferable, the interfacing means includes a wall of the assembly, the wall bearing a system of layers responsive to radiation received thereon from a source external to the assembly, the radiation from the source being guided by a response from one or more of the devices within the assembly to define the one or more regions in the system of layers, the layers providing a template for the formation of the one or more features in step (b). Use of the external source compensates for the one or more devices being responsive to radiation but not radiation emissive.

Conveniently, the system of layers includes a photoresponsive layer responsive to radiation emitted from the external source, the photoresponsive layer processable to define a first template which is transferable to an etch resist layer of the system, the etch resist layer forming a second template through which the wall is processable to generate the one of more features therein. The photoresponsive layer can, for example, be a photoemulsion responsive to radiation emitted from the external source, the source not restricted to being emissive at infra-red radiation wavelengths in the order of 1300 to 1550 nm.

Beneficially, the etch resist layer includes an UV-responsive organic resist layer. Such resist layers are conventionally used in semiconductor fabrication processes for providing a template for etching processes.

Where problems of resist adhesion and robustness are experienced, for example when undertaking isotropic acid etching using buffered hydrofluoric (HF) acid, the etch resist layer advantageously further includes a UV-responsive organic resist layer and also a silicon nitride layer into which the second template in the organic resist layer is transferable to form a third template in the silicon nitride layer through which the one or more features are generated. Silicon nitride is better able to resist etchant attack than organic resist for many conventionally used silicon etchants.

Conveniently, there are several alternative etching processes which can be used for forming the alignment features in the wall; the features can be generated by one or more of anisotropic wet etching, isotropic wet etching, dry plasma etching or dry reactive ion etching processes. Preferably, the one or more features are recesses into which the one or more external components are registerable for aligning to their respective one or more devices within the assembly.

Where the assembly is used for one or more of receiving and emitting infra-red radiation in the order of 1300 to 1550 nm wavelength, the wall is conveniently fabricated from silicon transmissive to infra-red radiation.

For ease of fabricating the assembly, the attaching means is advantageously a substantially transparent UV-curable adhesive.

In a second aspect of the present invention, there is provided an assembly fabricated by a method according to the first aspect of the invention, the assembly characterised in that it comprises one or more optoelectronic devices incorporated within a housing, the housing including the interfacing means in the form of a wall, the wall including the one or more features to which the one or more external components are registerable for aligning the components to their respective one or more devices.

Conveniently, the wall is fabricated from <100>-cut single-crystal silicon and is wet anisotropically etchable to form pyramidal recesses therein for providing the one or more features to which the external components are registerable. The pyramidal features provide a beneficial characteristic that they are self-limiting in size in a wet anisotropic etching process, thereby counteracting a need to monitor etching critically to counteract overetching, for example as can occur when wet isotropic etchants are employed.

Preferably, in order to obtain a more ruggedized assembly, the wall can be recessed within the housing, thereby exposing a greater surface area of the housing to which the attaching means can bind for anchoring the one or more external components to the assembly.

Conveniently, the one or more external components include one or more optical fibres, each fibre having its core protruding from its cladding where the core is registerable into the one or more features. Such alignment of the cores to the features provides an enhanced degree of coupling efficiency between the one or more external components and corresponding one or more devices within the assembly.

In a third aspect of the present invention, there is provided an array of assemblies, each assembly according to the second aspect of the invention.

BRIEF DESCRIPTION OF THE DRAWINGS

Embodiments of the invention will now be described, by way of example only, with reference to the following diagrams in which:

FIG. 6 is an illustration of a configuration for use according to a method of the invention;

FIG. 8 is an illustration of an alternative assembly according to the invention including a recessed plate enabling the assembly to provide improved support for an optical fibre attached to the alternative assembly; and FIG. 9 is an illustration of the assembly in FIG. 1 during fabrication thereof with etch resist and photochromic layers applied.

DETAILED DESCRIPTION OF THE PREFERRED EMBODIMENTS

Figure 1:
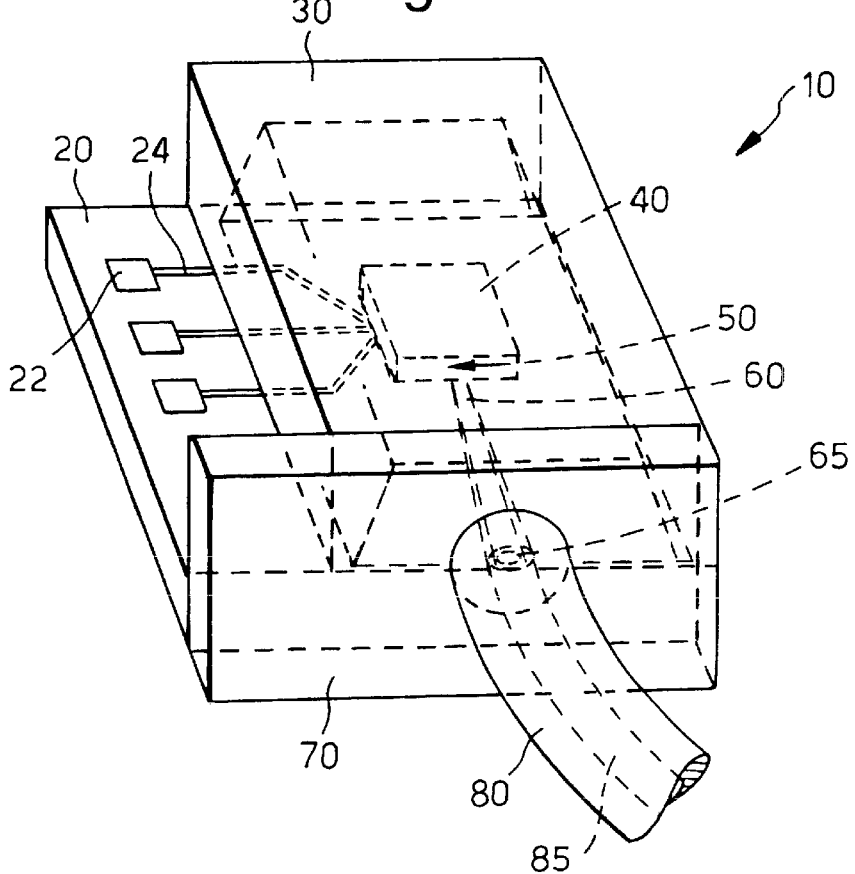
FIG. 1 is a schematic illustration of an optoelectronic assembly including an optical fibre aligned to the assembly according to a method of the invention.

Referring now to FIG. 1, there is shown an optoelectronic assembly indicated by 10. The assembly 10 comprises a silicon substrate 20 including an upper major face onto which is formed a 1 µm-thick silicon nitride insulating layer supporting 1 µm-thick aluminium electrode connection pads, for example a pad 22, connected to associated aluminium conductive tracks, for example a track 24.

The assembly 10 further comprises a <100> crystal orientation silicon cap 30 into which a recess has been anisotropically wet etched, and also a silicon end plate 70. In the assembly 10, the cap 30, the substrate 20 and the plate 70 are mutually fusion bonded, soldered or adhesively bonded; the recess of the cap 30 forms a hermetically-sealed cavity for housing a micro fabricated infra-red laser device 40 of conventional design. The device 40 is solder bump-bonded onto the tracks of the substrate 20, thereby enabling electrical connection to be made to the device 40 from the pads; during fabrication, the device 40 is bonded onto the tracks before the cap 30 and the plate 70 are bonded to the substrate 20 and to one another.

The device 40 incorporates an emitting region 50 from which, in operation, a beam 60 of infra-red radiation is emitted which propagates to illuminate a region 65 of the silicon end plate 70. The plate 70 includes a major external planar surface onto which a monomode fibre 80 is abutted and bonded, registering with its monomode core 85 into a recess etched into the major surface corresponding to the region 65. The plate 70 further comprises a major inner planar surface facing towards the device 40, the inner surface being substantially parallel to the external surface.

A first method of fabricating the assembly 10 and aligning the fibre 80 thereto will now be described in overview with reference to FIG. 1, the method comprising a series of sequential steps of:

STEP 1: fabricating the substrate 20 with its silicon nitride layer and associated tracks and pads as a first piece part;

STEP 2: fabricating the device 40 using conventional micro fabrication techniques as a second piece part;

STEP 3: fabricating the cap 30 as a third piece part from a section of a <100>-cut silicon wafer, fabrication involving initially delineating a first etch window photo-lithographically in the section, and then anisotropically selectively etching the section through the window in a mixture of isopropanol and potassium hydroxide (KOH) solution to generate the recess in the section;

STEP 4: scribing a <100>-cut silicon wafer having polished front and rear surfaces to provide the plate 70 as a fourth piece part;

STEP 5: assembling the first and second piece parts together, namely bump bonding the device 40 onto the tracks on the substrate 20, thereby enabling the device 40 to be electrically driven from the pads on the substrate 20;

STEP 6: assembling the third piece part onto the assembled first and second piece parts, namely fusion bonding, soldering or adhesively bonding the cap 30 onto the substrate 20 to form a cavity for the device 40;

STEP 7: assembling the fourth piece part to the assembled first, second and third piece parts, namely fusion bonding, soldering or adhesively bonding the plate 70 onto edges of the cap 30 and the substrate 20 as illustrated in FIG. 1 to provide a hermetically sealed housing for the device 40; a metallisation layer together with a window layer (not shown) can optionally be included between the plate 70 and the cap 30 and the substrate 20;

STEP 8: coating the external surface of the plate 70 with a photosensitive etch-resistant system of layers;

STEP 9: activating the device 40 via the pads so that it emits the beam of radiation 60 onto the plate 70 thereby exposing the region 65 thereon and also corresponding regions of the system of layers in close proximity to the region 65;

STEP 10: developing the system of layers to leave a second etch window through the layers in the vicinity of the region 65;

STEP 11: anisotropically etching a pyramidal-form recess into the external surface of the plate 70 where it is exposed through the second window in the system of layers;

STEP 12: stripping off the system of layers to leave the external surface of the plate 70 with its etched recess exposed;

STEP 13: at an end of the fibre 80, stripping off a short length of fibre cladding to leave the core 85 protruding;

STEP 14: offering the protruding core 85 to the recess and locating it therein; and STEP 15: applying optically-transparent bonding agent, for example UV curable Norland Inc. adhesive, onto the end of the fibre and the plate 70 and then UV curing it to bond and anchor the fibre 80 to the plate 70. If an interfacing lens is located into the recess and the fibre then registered near to the lens, an air interface may be required on a non-collimating side of the lens which is therefore optionally filled with the curable adhesive.

Although fabrication of the assembly 10 as a single item is described, the method can be extending to use parallel batch processing techniques so that several such devices can be processed simultaneously according to the invention.

The first method provides the advantage that, after assembling the substrate 20, the cap 30, the device 40 and the plate 70 together to fix their relative spatial positions, the device 40 is capable of defining its own recess position on the plate 70 which precisely aligns with the beam 60 emitted from the device 40. Thus, none of the substrate 20, the cap 30, the device 40 and the plate 70 need to be particularly accurately mutually aligned during assembly, accuracy of position of the recess relative to the device 40 being achieved by allowing the beam 60 to define a precise position for the recess to ensure efficient coupling of radiation into the fibre 80. This advantage is of considerable commercial importance because it circumvents a need to manufacture component parts which are mutually matched to a high degree of accuracy, thereby reducing cost of manufacture.

The system of layers in STEPS 8 to 12 is peculiar to the method and will be described in further detail with reference to FIG. 2. The system of layers is indicated by 100. It comprises in sequence from the major external surface of the plate 70 indicated by 120:

(a) an organic resist layer 130, for example a Hoechst AZ series organic resist such as AZ1505, in a range of 1 to 1.5 $\mu$m thick;

(b) a conventional silver-based proprietary photoemulsion layer 140 in the order of 0.5 to 5 $\mu$m thick which is responsive to radiation in the visible electromagnetic radiation spectrum having a wavelength range from 200 nm to 800 nm; and (c) a frequency-multiplier layer 150 in the order of 1 to 20 $\mu$m thick, the frequency-multiplier layer 150 comprising a unitary layer of potassium titanyl phosphate.

Operation of the system of layers 100 will now be described with reference to FIG. 2, operation corresponding to STEP 9 to STEP 15 in the first method described above. The device 40 is activated to generate the beam of infra-red radiation 60 having a wavelength in the order of 1300 to 1550 nm. The beam 60 propagates from the device 40 to the inner surface of the plate 70 at the region 65, the inner surface indicated by 110. The beam 60 propagates through the plate 70 to exit into the resist layer 130 through which it propagates to the photoemulsion layer 140; photons in the beam 60 have insufficient quantum energy to substantially affect the resist layer 140. The layer 140 is insensitive to infra-red radiation and requires shorter wavelength radiation having a wavelength of less than 800 nm to form a latent image therein. The beam 60 thus propagates through the photoemulsion layer 140 without affecting it and is finally absorbed in the frequency-multiplier layer 150.

The layer 150 performs a frequency multiplying operation. Photons of radiation having a relatively longer wavelength in the order of 1300 to 1550 nm incident on the layer 150 stimulate therein the generation of photons having a relatively shorter wavelength in the order of 650 nm which are subsequently emitted from the layer 150. It takes several photons of the relatively longer wavelength to be absorbed to generate a photon of the relatively shorter wavelength.

Thus, infra-red radiation photons absorbed where the beam 60 is incident on the layer 150 result in the generation of relatively shorter wavelength photons in the visible range which are emitted locally to the layer 140 and result in the formation of a latent image therein in the vicinity of where the beam 60 propagates through the layer 140 in an outwards direction from the device 40.

When the device 40 has been activated for a sufficiently long duration to form a latent image in the photoemulsion layer 140, the device 40 is de-activated. The layer 150 is then removed to expose the layer 140; removal of the layer 150 is performed in dark-room conditions to avoid further exposure of the layer 140 and disturbing the latent image formed therein. The layer 140 is then developed using a conventional proprietary photographic process appropriate for the layer 140 material. Development of the layer 140 provides a darkened opaque region in the vicinity of the region 65 because the layer 140 functions in negative sense. The resist layer 130 is then exposed to ultra-violet (UV) radiation of substantially 250 nm wavelength through the layer 140 which hardens the resist layer 130 by polymerisation except in the vicinity of the darkened opaque region where the resist layer 130 remains locally relatively soft. Once this exposure has occurred, residual traces of the layer 140 are dissolved away and the resist layer 130 is then developed in a solvent, for example a proprietary solvent mixture comprising methyl isobutyl ketone and isopropanol, to leave a window in the resist layer 130 in the vicinity of the region 65, a remainder of the resist layer 130 remote from the region 65 remaining intact in a hardened polymerized state.

The assembly 10 is then covered in a protective resin or photoresist except for the plate 70 with its resist layer 130 which is left exposed for etching purposes, the resin or photoresist capable of withstanding anisotropic silicon etches such as KOH/isopropanol solution mixtures. The resin protects, for example, the tracks and pads of the assembly 10 from the anisotropic etchants.

Figure 3:
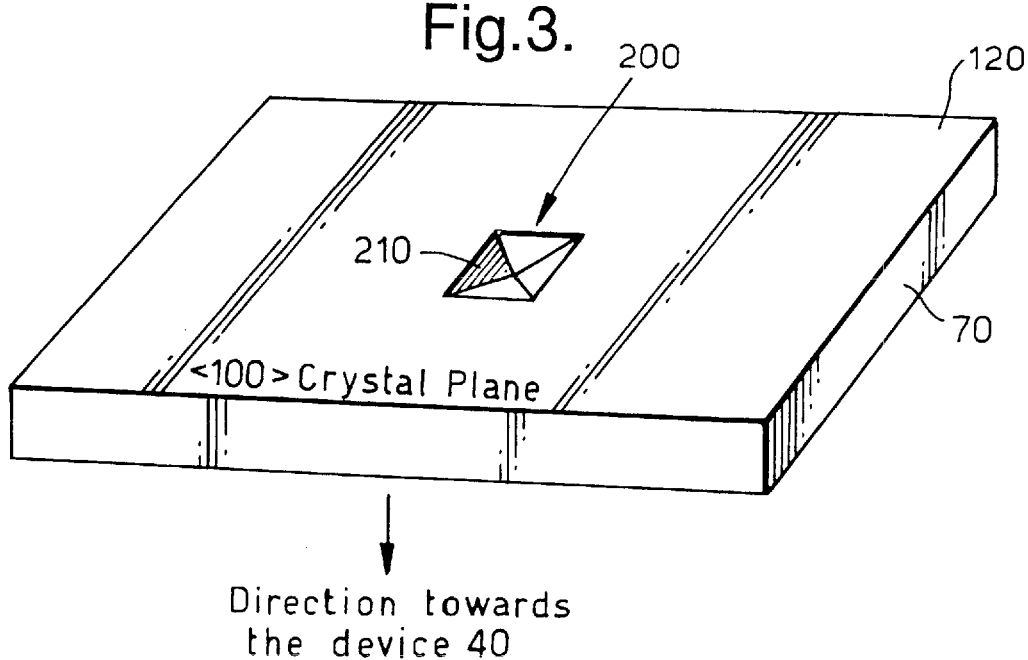
FIG. 3 is an illustration of an alignment recess etched into the assembly for receiving the fibre in FIG. 1.

The assembly 10 is then immersed in an anisotropic silicon etch solution, for example a KOH/isopropanol mixture, which has access to the plate 70 through the window in the vicinity of the region 65. The solution etches a self-limiting pyramidal recess in the surface 120 of the plate 70 as illustrated in FIG. 3; the recess is indicated by 200 and comprises four <111> crystal plane surfaces, for example a surface 210.

When etching of the recess 200 has occurred, the assembly 10 is removed from the etch solution, the resin or resist protecting the assembly 10 and the resist on the surface 120 are then stripped to yield the assembly 10 with its recess 200 precision aligned to the device 40.

Figure 4:
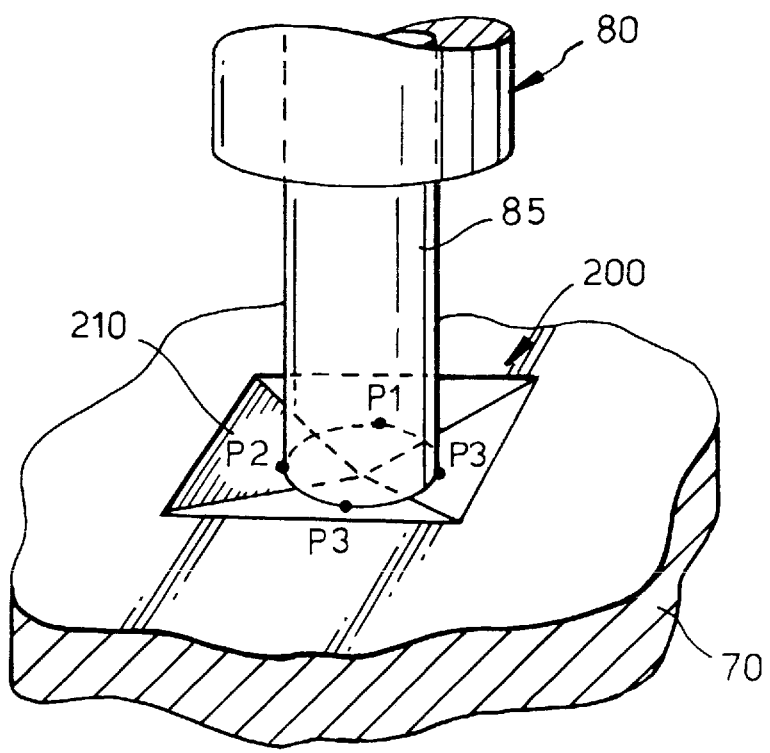
FIG. 4 is an illustration of a core of the fibre in FIG. 1 locating into the recess of FIG. 3.

An end of the fibre 80 with its core 85 protruding at the end is then offered up to the surface 120 so that the core 85 locates into the recess 200 as illustrated in FIG. 4. In FIG. 4, the core 85 abuts at its peripheral circumferential edge onto surfaces of the recess 200 at points P1 to P4 as illustrated, for example, the core 85 abuts at its peripheral edge to the surface 210 at the point P2.

When the core 85 is correctly abutted into the recess 200, the fibre 80 in the vicinity of the plate 70 and the surface 120 are covered in a quantity of optically transparent bonding resin, for example Norland Inc. optical UV-curable resin type N65, which is then UV (ultra violet radiation) cured, thereby forming a mechanical bond of the fibre 80 to the assembly 10. Abutment of the core 85 within the recess 200 assists to ensure that precision alignment to the device 40 is substantially maintained even if the bonding resin shrinks or changes dimension slightly due to ageing processes.

Figure 2:
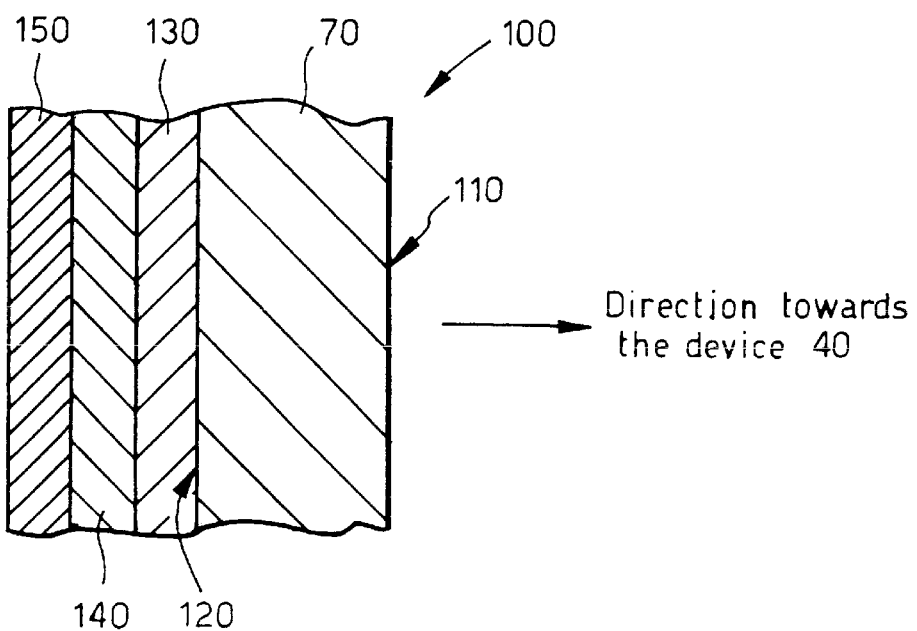
FIG. 2 is an illustration of a system of layers used for fabricating the assembly in FIG. 1.

The layers 130, 140 in FIG. 2 are chosen to be sufficiently thin to counteract lateral scattering of the beam 60 as it propagates therethrough. Conversely, they are chosen to be sufficiently thick to enable the window to be reliably defined in the resist layer 130, and to survive anisotropic etching necessary to form the recess 200. If scattering is isotropic through the layers 130, 140, a limited degree of scattering can be tolerated because the recess 200 will be substantially correctly centered to the region 65.

Figure 5:
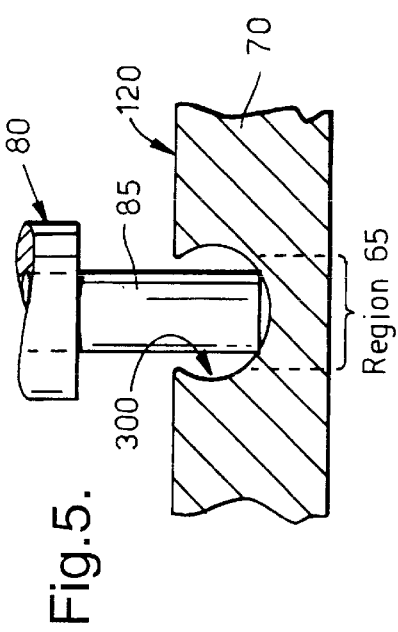
FIG. 5 is a cross-sectional illustration of a core of the fibre in FIG. 1 locating into an isotropically etched recess of the assembly in FIG. 1.

In the aforementioned first method, the multiplying layer 150 need not be included for forming the recess if the device 40 is substituted with a corresponding device emitting radiation in a wavelength range to which the layer 140 is substantially responsive. In the aforementioned first method, wet isotropic etching can alternatively be used in STEP 11 instead of wet anisotropic etching. Suitable isotropic etchants for etching the plate 70 through the window in the resist layer 130 include buffered hydrofluoric acid. In FIG. 5, such wet isotropic etchants result in the formation into the surface 120 of a rounded substantially-hemispherical recess indicated by 300 into which the core 85 can locate; the core 85 is located around its entire peripheral edge onto an inside surface of the recess 300. Wet isotropic etching tends to be dimensionally less accurately controllable compared to wet anisotropic etching on account of isotropic etching rate being dependent upon spatially localised etchant flow rates. The self-limiting characteristic of wet anisotropic etching is thus capable of providing more accurately centered recesses compared to recesses formed by isotropic etching processes where self-limiting does not occur.

As an alternative to using wet isotropic or anisotropic etchants, gaseous plasma or reactive ion etching can be employed in STEP 11 although the effects of plasma field distortion around the assembly 10 has to be allowed for when such dry etching is employed. Plasma or reactive ion etching can be isotropic or anisotropic depending upon etching gas pressure employed and electric field distributions in the vicinity of the assembly 10 during such etching. Suitable etching gases can include hydrogen-halide compounds, or a mixture of oxygen and carbon-halide compounds.

In the system 100 shown in FIG. 2, the photoemulsion layer 140 and the frequency-multiplier layer 150 can alternatively be replaced by a single layer of infra-red radiation sensitive photoemulsion. Such infra-red photoemulsions are employed in the manufacture of infra-red films as used in road traffic speed cameras and are a conventional proprietary product. When such an infra-red sensitive photoemulsion is used, the device 40 is capable of exposing the emulsion directly without the need for frequency multiplication in the layer 150.

Although the method including STEPS 1 to 15 is suitable for the assembly 10 incorporating the device 40 which is radiation emissive, the method can be modified to cope with a situation where the device 40 in the assembly 10 is replaced by a detecting device, for example a photodetector responsive to infra-red radiation at a wavelength of substantially 1550 nm.

In FIG. 6, there is illustrated a configuration indicated by 500 including the device 10 fabricated according to STEPs 1 to 6 of the first method but incorporating a photodetecting device 400 instead of the device 40. The configuration 500 further includes a projector indicated by 550, a plinth 610 and an actuator mechanism 600. The projector 550 and the mechanism 600 are mounted onto the plinth 610. The mechanism 600 incorporates a platform onto which the assembly 10 is mounted. FIG. 6 is not to scale and certain parts therein are shown in relatively exaggerated size for clarity.

The projector 550 incorporates an optical unit 560 incorporating mirrors which are capable of focussing radiation both at infra-red radiation wavelengths in the order of 1300 to 1550 nm and also at visible radiation wavelengths around 560 nm. Moreover, the projector 550 further incorporates a beam directing mirror 570, a first laser source 580 operable to emit a beam of radiation in the order of 1300 to 1550 nm wavelength and a second laser source 590 operable to emit a beam of radiation at around 560 nm wavelength. The mirror 570 is pivotally mounted at a point P at one end thereof and is controllably movable between a first position as illustrated in FIG. 6 and a second position where it is retracted as shown by a dotted line 620.

The assembly 10 has in sequence the layer of resist 130 deposited onto the major exterior surface 120 of the plate 70 followed by the conventional photoemulsion layer 140. The configuration 500 is maintained in darkroom conditions to avoid forming a latent image in the layer 140 prior to irradiation from the sources 580, 590.

The mechanism 600 is operable to controllably move the assembly 10 laterally in directions x and y with respect to the projector 550 as shown in FIG. 6; the direction x is in a sense out of the plane of the paper, directions x, y, z are mutually orthogonal, and the directions y, z are in the plane of the paper.

The projector 550 is operable to project images of the first source 580 and the second source 590 onto a region 410 of the device 400 and onto the external surface 120 of the plate 70 respectively. These images are formed at different distances from the projector 550, such distances determined by the second source 590 being situated further from the mirror 570 relative to the first source 580 therefrom. The sources 580, 590 are solid-state laser devices which provide point objects for the optical unit 560 in the order of 1 to 3 μm diameter.

A second method of fabricating the assembly 10 including the device 400 will now be described with reference to FIG. 6, the method employing the configuration 500 and including the following steps:

STEP A: Fabricating the assembly 10 including the device 400 according to STEPs 1 to 6 of the aforementioned first method. Then, making electrical connections to the pads of the assembly 10 to enable a signal to be conveyed therefrom to a control unit (not shown). The control unit is also connected to the mechanism 600 and the projector 550.

STEP B: Rotating the mirror 570 to the second position 620 by instruction from the control unit. Then, activating the first source 580 to emit a beam of infra-red radiation at a wavelength of around 1550 nm towards the optical unit 560 thereby projecting an image of the source 580 towards the device 400. Next, instructing from the control unit the mechanism 600 to move the assembly 10 laterally with respect to the projector 550 until the image is incident on the region 410 which causes a received signal to be generated by the assembly 10 at its pads. These signals are conveyed via connections through the mechanism 600 to the control unit.

STEP C: Deactivating the first source 580. Next, rotating the mirror 570 to the first position as illustrated in FIG. 6, and then activating the second source 590 to generate a beam of radiation at around 560 nm wavelength which is reflected by the mirror 570 to the optical unit 560 thereby projecting an image of the second source 590 onto the exterior surface 120 of the plate 70. Where a beam associated with the second source's 590 image propagates through the layer 140, it forms a latent image therein. Because images of the sources 580, 590 are formed along an optical axis common to the sources 580, 590, the latent image is formed in a region of the layer 140 to which the device 400 is receptive. The second source 590 is then deactivated.

STEP D: Removing the assembly 10 from the mechanism 600 and developing the latent image in the layer 140 using a proprietary developer; this is undertaken in dark-room conditions where ambient radiation in the visible spectrum is excluded. Where the film 140 is exposed to the image of the second source 590, there results in the layer 140 an opaque region. The assembly 10 is then exposed to general UV irradiation which hardens the layer 130 except in a region of the layer 130 corresponding to the opaque region in the layer 140.

STEP E: Stripping away the layer 140 and then developing the resist layer 130. After development, hardened regions of the resist remain with an exception of the region shadowed by the opaque region in the layer 140 where a window through the resist layer 130 is formed to the surface 120.

STEP F: Coating the assembly 10 in resin or resist except for the plate 70 and next immersing the assembly in a wet anisotropic etch solution, namely a KOH/isopropanol mixture, to etch a recess into the plate 70 corresponding to the window.

STEP G: Stripping the resin/resist and the resist layer 130 using appropriate solvents when anisotropic etching of the assembly 10 has been completed. The monomode fibre 80 with its cladding removed at one end thereof to expose a length of monomode core 85 protruding therefrom is then offered up to the assembly 10 so that the protruding core 85 locates into the recess. UV-curable substantially transparent optical bonding adhesive is then applied over the end of the fibre 80 and the plate 70 to rigidly maintain the protruding core 85 of the fibre 80 aligned to the recess and anchored relative thereto. This completes connection of the assembly 10 to the optical fibre 80, the assembly 10 responsive to infra-red radiation conveyed along the fibre 80 to the assembly 10. If more efficient coupling is desired from the fibre 80 into the device, a lens is included in the recess and the end of the core 85 is then aligned to the lens; the UV curing adhesive is then applied over the fibre 80 to anchor it to the assembly 10.

Parallel processing of several assemblies similar to the assembly 10 incorporating the device 400 can be undertaken to reduce cost. However, operation of the configuration 500 is essentially a serial process addressing only a single assembly at any instance of time.

Instead of employing wet etching to form the recess in the plate 70 of the assembly 10 incorporating the detector 400, wet isotropic etching and gaseous plasma or reactive ion etching can alternatively be employed.

The configuration 500 and its associated method STEPS A to G can be modified. For example, the second source 590 can be replaced with a shorter wavelength source eissive at ultra violet (UV) radiation so that the resist layer 130 can be exposed directly during the method thereby circumventing a need to include the layer 140 and performing processing steps associated with STEP D. Making this modification avoids the need to ensure dark-room conditions during the second method. A compact excimer laser can be used as a substitute for the source 590 to provide the UV radiation.

Moreover, the configuration 500 can be modified to assist with forming an alignment recess in the plate 70 when the device 400 is replaced with the emissive device 40. The first source 580 is replaced with an infra-red detector device incorporating apertures to provide it with a sensing aperture of a few $\mu$m in diameter, the device connected to the control unit. In operation, the mirror 570 is retracted into the second position 620 and the device 40 in the assembly 10 is then activated via the mechanism 600 from the control unit to emit a beam of infra-red radiation. The mechanism 600 then moves the assembly 10 relative to the projector 550 until the infra-red detector device generates a signal in response to receiving radiation emitted from the device 40 within the assembly 10. The mirror 570 is then pivotally rotated to its first position where it reflects radiation emitted from the second source 590 to form a latent image in the layer 130, 140 corresponding to the recess. Development and etching process as described before in STEPS D to G are then applied to form the recess and align and anchor the fibre 80 thereto.

In the modified configuration 500 where the first source 580 is replaced by an infra-red detector device, the second source 590 can be replaced with a UV source, for example an excimer laser, thereby circumventing a need to include the layer 140 and to perform STEP D in the second method.

Figure 7:
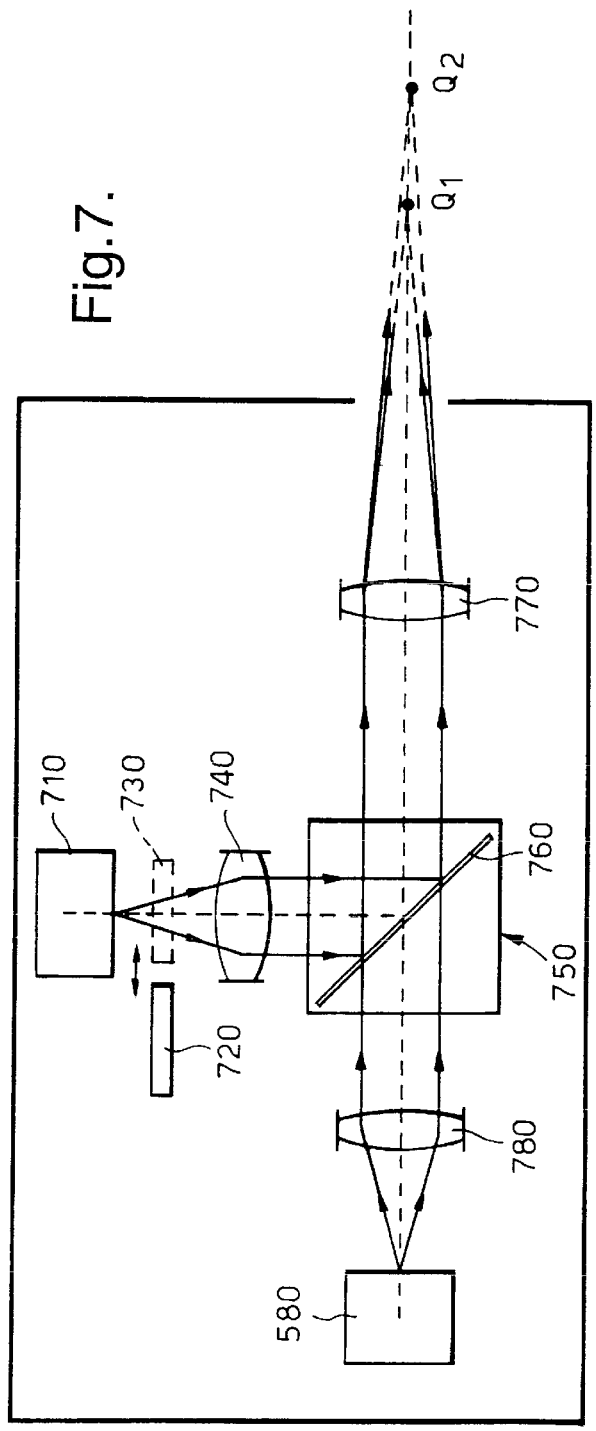
FIG. 7 is an illustration of an alternative projector for use in the configuration in FIG. 6 according to a method of the invention.

The projector 550 in the configuration 500 can be substituted by an alternative projector indicated by 700 and illustrated in FIG. 7. The projector 700 incorporates a first optical assembly comprising the first source 580 and an associated collimating lens 780; the lens 780 is conveniently fabricated from BK7 glass or a plastics material, although germanium and silicon can be used but then tend to make the lens 780 expensive to manufacture. The projector 700 further includes a second optical assembly comprising a second source 710 radiation emissive at a wavelength in the order of 560 nm together with an associated actuated shutter 720 moveable between an off-axis position and a blocking position 730 and an associated silica glass or quartz lens 740. The projector 700 additionally includes a third optical assembly comprising a mirror unit indicated by 750 comprising a dichroic mirror 760 orientated with its plane at an angle of 45° with respect to optical axes of the first and second optical assemblies whose axes are mutually orthogonal. The projector 700 also incorporates a projection lens 770 operable to project images of the sources 580, 710 onto points Q2 and Q1 respectively. The point Q2 corresponds to a point on the device 40, 400 within the assembly 10. The point Q1 corresponds to a point in the layers 130, 140.

Operation of the projector 700 when incorporated into the configuration 500 will now be described where the assembly 10 includes the detecting device 400.

Initially, the sources 580, 710 are not activated. The shutter 720 is moved by the control unit to the blocking position 730. The source 580 is then activated to generate a beam of infra-red radiation which propagates from the source 580 to the lens 780 which collimates the beam to generate a collimated beam which further propagates to the dichroic mirror 760 through which it passes substantially undeflected to the lens 770 which focusses the collimated beam to generate an image at the point $Q_2$ on the device 400 within the assembly 10. The control unit then moves the assembly 10 relative to the projector 700 until an output signal is generated in response to radiation received at the detector device 400; this corresponds to the beam from the source 580 illuminating the region 410 of the device 400. The control unit then finely moves the assembly 10 on the mechanism 600 until the detector 400 receives radiation corresponding to a central region of the beam from the source 580. The source 710 is then activated and the shutter 720 moved to its off-line position; the source 710 emits a beam of radiation which is collimated by the lens 740 to provide a collimated beam which propagates to the dichroic mirror 760 and is reflected thereat in a direction towards the lens 770. The reflected beam passes through the lens 770 which forms an image at the point $Q_1$ in the plane of the layers 130, 140 thereby forming a latent image in the layer 140.

Processing steps from STEP D to STEP G are then applied to form the recess in the assembly 10 for receiving the fibre 80.

In a similar manner to the projector 550, the source 580 in the projector 700 can be replaced by an infra-red detector connected to the control unit thereby enabling the configuration 500 including the projector 700 to be used for defining a recess position for the assembly 10 when it incorporates an infra-red emissive device, for example the device 40. Likewise, the second source 710 can be replaced by an excimer laser operable to emit UV radiation, thereby circumventing a need to perform STEP D and to include the layer 140.

Referring now to FIG. 8, there is shown an alternative assembly indicated by 800. The assembly 800 can be fabricated using the aforementioned first and second methods. The assembly 800 includes either the device 40 or the detector device 400. Moreover, the assembly 800 is similar to the assembly 10 except that the plate 70 is moved further inside the assembly 800 compared to the assembly 10, thereby providing greater mechanical support to the fibre 80 when bonded into position using UV-curable adhesive after its core 85 has been aligned to an alignment recess in the plate 70, the recess indicated by 820. In FIG. 8, a cured region of the adhesive for anchoring the fibre 80 to the assembly 800 is indicated by 810.

A third method of fabricating the assembly 10 will now be described with reference to FIG. 9. In FIG. 9, there is shown indicated by 900 the assembly 10 fabricated according to STEPs 1 to 6 of the first method and coated at the external surface 120 of its plate 70 with a positive-tone etch resist layer 910 followed by a photochromic layer 920. Formation and operation of photochromic layers is described in a patent GB 2208271 which is hereby incorporated by reference. The assembly 10 incorporates the emissive device 40.

The third method includes the following steps:

STEP 1: Fabricating the assembly 10 according to STEPs 1 to 6 of the first method;

STEP 2: Coating the plate 70 in the layer of etch resist 910 followed by the photochromic layer 920;

STEP 3: Exposing the assembly 10 to UV radiation having a wavelength in the order of 250 nm to activate the photochromic layer 920;

STEP 4: Activating the device 40 within the assembly 10 to emit the beam 60 of infra red radiation therefrom, the beam 60 propagating to the plate 70 and the layer 910, passing therethrough to a local region of the layer 920 corresponding to the region 65 whereat the beam 60 causes bleaching of the layer 920 thereby rendering it locally transmissive to the externally applied UV radiation. At the region, the photochromic layer 920 transmits the UV radiation to the resist layer 910 which causes softening thereof in close proximity to the region in the layer 920;

STEP 5: Stripping the photochromic layer 920 and then developing the etch resist layer 910 in an appropriate solvent to provide an etch window corresponding to the local region in the photochromic layer 920;

STEP 6: Applying STEPs 11 to 15 of the first method to form a recess and then registering the core 85 of the fibre 80 to the recess. Finally, anchoring the fibre 80 to the assembly 10 using UV curable substantially transparent adhesive.

The third method provides the benefit that it does not need to be conducted in dark-room conditions. Moreover, it is a simpler process than the first and second methods. However, it is only appropriate where the assembly 10 incorporates a radiation emissive device, for example the device 40.

Modifications can be made to the embodiments and methods of the invention described in the foregoing without departing from the scope of the invention. For example, alternative types of photoemulsion and resist layers can be employed in the system 100. The photoemulsion layer 140 and the resist layer 130 described in the foregoing operate in negative sense; it is possible to perform STEPS 9 to 10 and STEPS C to F using photoemulsions and photoresist materials operating in positive sense.

Moreover, a 0.5 $\mu$m-thick layer of silicon nitride can be included between the resist layer 130 and the external surface 120 of the plate 70. In the STEPS 10 to 11 and STEPS E to F, the windows formed in the resist layer 130 can be transferred by reactive ion etching or a phosphoric acid etchant to form a window in the silicon nitride layer. Silicon nitride forms a more effective barrier against wet anisotropic and isotropic etches than organic resist and a layer of silicon nitride should therefore be incorporated where problems are encountered with resist robustness when executing the methods of the invention described in the foregoing.

Although the assembly 10 is described including either the device 40 or the detector device 400, the assembly 10 can be enlarged to include both emitting devices and photodetectors. Moreover, several aligned recesses can be formed into the plate 70 of such an enlarged assembly. The recesses can be etched to a size appropriate for accommodating components such as microlenses; in this case, fibres can be abutted to locate onto the lenses, the lenses being located precisely into position in their respective recesses.

Assemblies incorporating collimating lenses in their recesses, each assembly otherwise similar to the assembly 10 including the device 40 or the detector device 400 or both, can be assembled into a matrix, thereby providing an optically interconnected array. Such arrays are potentially usable in communication systems and light optical directing and ranging (LIDAR) systems, for example for use in making air flow measurements.

In the foregoing, optical lenses located into the recess 200, 300 formed into the assembly 10 can included moulded lenses and ball lenses for generated collimated input and/or output beams from the assembly 10. Similarly, by choice of lens focal length, converging or diverging beams can be generated.

In the assemblies 10, 800, the plate 70 is fabricated from silicon. In modified versions of the assemblies 10, 800, the plate 70 can be alternatively fabricated from germanium or an infra-red transmissive plastics material.

The resist layer 130 is capable of inefficient conversion of infra-red radiation directly to ultra-violet radiation for exposing itself. Likewise, the multiplier layer 150 is also capable of performing such inefficient direct conversion. When fabrication time allows, exploitation of this characteristic of the layers 150, 130 allows at least the layer 140 to be dispensed with thereby simplifying process steps of the first method, for example STEPS 8, 9 and 10. Such conversion is known as "3 or 4 photon conversion" and corresponds to three to four photons of infrared radiation being absorbed in the resist layer 130 or the multiplier layer 150 and causing electrons therein to be excited to higher energy states; when the electrons return to their respective ground states, some change their energy state by amounts corresponding to the quantum energy of UV photons, thereby emitting UV photons. Such UV photons are then able to cause exposure of the resist in the resist layer 130 thereby locally altering its chemical structure.

I claim:

1. A method of alignment in an optoelectronic assembly (10), the assembly including one or more optoelectronic devices (40, 400) and interfacing means (70) for interfacing from the one or more devices (40, 400) to one or more corresponding optoelectronic components (80, 85) external to the assembly (10), the method characterised in that it includes the steps of:

(a) defining one or more regions (65) of the interfacing means (70) to which the one or more devices are responsive to or emissive towards, thereby rendering the one or more regions (65) delineated for processing purposes;

(b) processing the assembly (10) to generate one or more alignment features (200, 300) at the one or more regions (65), the one or more features (200, 300) operable to assist with aligning the one or more external components (80, 85) relative to their respective one or more devices (40, 400) within the assembly (10);

(c) aligning the one or more components (80, 85) to their respective features (200, 300) so as to be operable to emit towards or receive radiation from their respective one or more devices (40, 400); and (d) applying attaching means (810) for attaching the one or more external components (80, 85) to the assembly when aligned to their respective features (200, 300), the one or more components thereby optically aligned to their corresponding one or more devices (40, 400) within the assembly (10).

2. A method according to claim 1 wherein, in step (a), the interfacing means (70) includes a wall of the assembly, the wall bearing a system of layers (100) responsive to radiation emitted from the one or more devices (40) within the assembly (10) for defining the one or more regions (65) in the system of layers (100), the layers (130, 140, 150) providing a template for the formation of the one or more alignment features (200, 300) in step (b).

3. A method according to claim 2 wherein the system of layers comprises:

(a) an etch resist layer (910) through which the wall (70) is processable to generate the one or more features (200, 300) therein; and (b) a photochromic layer (920) operable to be activated by externally applied radiation and capable of being rendered locally transmissive in response to radiation received thereat from the one or more devices, thereby enabling the externally applied radiation to define regions in the resist layer (910) corresponding to the one or more features (200, 300), the resist layer (910) providing a template for formation of the one or more features.

4. A method according to claim 2 wherein the system of layers (100) includes multiplying means (150) for frequency multiplying radiation emitted from the one or more devices (40) within the assembly (10), thereby generating corresponding relatively shorter wavelength radiation for defining the one or more regions (65) in one or more layers of the system (100).

5. A method according to claim 4 wherein the multiplying means (150) comprises a multiplying layer (150) including potassium titanyl phosphate which is operable to emit radiation at a relatively shorter wavelength when stimulated by relatively longer wavelength radiation (60) emitted from the one or more devices (40).

6. A method according to any one of claim 4 wherein the system of layers (100) includes a photoresponsive layer (140) responsive to radiation emitted from the one or more devices (40) within the assembly subject to frequency multiplication in the multiplying means (150), the photoresponsive layer processable to define a first template which is transferable to an etch resist layer of the system, the etch resist layer forming a second template through which the wall is processable to generate the one of more features(200, 300) therein.

7. A method according to claim 2 wherein the system of layers (100) includes a photoresponsive layer responsive to radiation emitted from the one or more devices within the assembly, the photoresponsive layer processable to define a first template which is transferable to an etch resist layer of the system, the etch resist layer forming a second template through which the wall is processable to generate the one of more features (200, 300) therein.

8. A method according to claim 1 wherein, in step (a), the interfacing means (70) includes a wall of the assembly, the wall (70) bearing a system of layers (100) responsive to radiation received thereon from a source external (590) to the assembly (10), the radiation from the source being (590) guided by a response from one or more of the devices (400) within the assembly (10) to define the one or more regions (65) in the system of layers (100), the layers (130, 140) providing a template for the formation of the one or more features in step (b).

9. A method according to claim 8 wherein the system of layers includes a resist layer (130), the source external to the assembly operable to be UV radiation emissive and capable of defining the one or more regions (65) directly in the resist layer (130), the layer (130) providing a template for the formation of the one or more features (200, 300) in step (b).

10. A method according to claim 8 wherein the system of layers (100) includes a photoresponsive layer (140) responsive to radiation emitted from the external source (590), the photoresponsive layer (140) processable to define a first template which is transferable to an etch resist layer (130) of the system (100), the etch resist layer (130) forming a second template through which the wall (70) is processable to generate the one of more features (200, 300) therein.

11. A method according to claim 7 wherein the etch resist layer (130) includes an UV-responsive organic resist layer.

12. A method according to claim 7 wherein the etch resist layer further includes a UV-responsive organic resist layer and also a silicon nitride layer into which the second template in the organic resist layer (130) is transferable to form a third template in the silicon nitride layer through which the one or more features (200, 300) are generated.

13. A method according to claim 1 wherein, in step (a), the interfacing means includes a wall (70) of the assembly (10), the wall (70) bearing a system of layers (100) responsive to radiation received thereon from a first source (590) external to the assembly (10), the assembly (10) including a second source (400) of radiation operable to emit radiation which is detectable externally to the assembly (10) and used to guide the radiation from the first source (590) to define the one or more regions (65) in the system of layers (100), the layers (130, 140) providing a template for the formation of the one or more features (200, 300) in step (b).

14. A method according to claim 13 wherein the system of layers includes one or more layers.

15. A method according to claim 1 wherein the features are generated by one or more of anisotropic wet etching, isotropic wet etching, dry plasma etching or dry reactive ion etching processes.

16. A method according to claim 1 wherein the one or more features are recesses (200, 300) into which the one or more external components (85) are registerable for aligning to their respective one or more devices (40, 400) within the assembly.

17. A method according to claim 1 wherein the one or more external components comprise one or more lenses registerable into the more or more features for coupling radiation between the one or more devices (40, 400) and one or more optical fibres attached to the assembly (10).

18. A method according to any one or claim 2 wherein the wall (70) is fabricated from a material transmissive to infra-red radiation.

19. A method according to claim 18 wherein the material includes one or more of silicon, germanium and an infra-red transmissive plastics material.

20. A method according to claim 1 wherein the attaching means (810) is a substantially transparent UV-curable adhesive.

21. An assembly fabricated by a method according to claim 1, the assembly characterised in that it comprises one or more optoelectronic devices (40, 400) included within a housing, the housing including the interfacing means (70) in the form of a wall (70), the wall (70) including the one or more features (200, 300) to which the one or more external components (80, 85) are registerable for aligning the components (80, 85) to their respective one or more devices (40, 400).

22. An assembly according to claim 21 wherein the wall (70) is fabricated from <100>-cut single-crystal silicon and is wet anisotropically etchable to form pyramidal recesses (200) therein for providing the one or more features (200) to which the one or more external components (85) are registerable.

23. An assembly according to claim 21 wherein one or more plastic moulded lenses or ball lenses are registered to the one or more features and optical fibres are attached to the lenses, said lenses being operable to enhance radiation coupling between the one or more devices and optical fibres attached to the lenses.

24. An assembly (800) according to claim 21, wherein the wall (70) is recessed within the housing, thereby exposing a greater surface area of the housing to which the attaching means (810) can bind for anchoring the one or more external components (80, 85) to the assembly (800).

25. An assembly according to claim 21, wherein the one or more external components include one or more optical fibres (80), each fibre having its core (85) protruding from its cladding where the core is registerable into the one or more features (200, 300).

26. An array assemblies, each assembly according to claim 21, each assembly of the array including collimating lenses for enabling one or more of the assemblies to provide collimated beams of radiation therefrom or for enabling one or more of the assemblies to receive one or more collimated beams of radiation.

27. An array of assemblies according to claim 26 wherein a plurality of the assemblies are configured to be in mutual optical communication by use of the one or more beams of collimated radiation.

* * * * *